March 1, 1966 G. RAVAL 3,238,431
OSCILLATING RESONATOR FOR A TIMEPIECE WITH SYNCHRONIZED DRIVING OSCILLATOR
Filed Jan. 25, 1965 4 Sheets-Sheet 1

3,238,431
Patented Mar. 1, 1966

3,238,431

OSCILLATING RESONATOR FOR A TIMEPIECE WITH SYNCHRONIZED DRIVING OSCILLATOR

Gaston Raval, Neuveville, Switzerland, assignor to Omega Louis Brandt & Frère S.A., Bienne, Switzerland Filed Jan. 25, 1965, Ser. No. 427,887
12 Claims. (Cl. 318—130)

Figure 1:
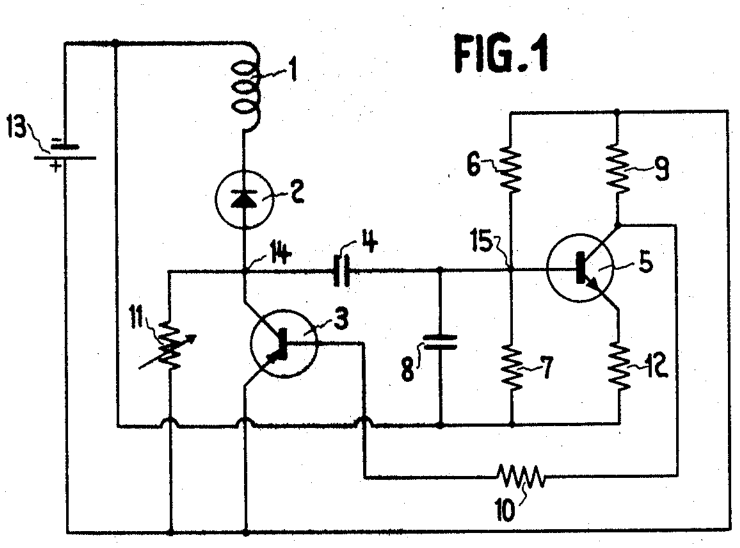

This application is a continuation-in-part of U.S. patent application Serial No. 271,074, filed August 15, 1962, now abandoned.

This invention relates to an oscillator system for an electronic timepiece. Oscillator systems of this type are well known wherein the oscillation of a mechanical oscillating system or resonator, for instance of a balance wheel, a tuning fork or the like, is started and sustained by electrical energy applied to the resonator by an electronic amplifier or oscillator. In the following specification and in the claims the designation resonator will generally be used for any mechanical oscillating system capable of oscillation at a resonant frequency for time-keeping purposes when continuously maintained in oscillation by driving energy applied at the resonant frequency. The natural frequency of the resonator or of the electronic oscillator is the frequency at which free oscillation of the resonator or oscillator occurs under the conditions present in the timepiece and without further external influence. As an example the resonant frequency of a balance wheel when neglecting the influence of damping is given by the formula $$Fo=\frac{1}{\pi}\sqrt{\frac{M}{I}}$$

wherein:

$I$=moment of inertia of the balance wheel $M$=moment of elasticity of the hair spring.

The balance wheel of a wrist watch is subjected to rotational acceleration and deceleration that can stop the balance wheel for a short instance. It is therefore of the utmost importance that the oscillator system have good self-starting properties in order to reestablish nominal amplitude in the event that it has been stopped. However, it has been heretofore almost impossible to obtain simultaneously good starting and good running efficiency.

In most of the prior time-keeping oscillator systems of this type two coils are coupled with the resonator, the one coil being a control coil or pick-up coil wherein control signals are produced at the frequency of or at a multiple of the frequency of the resonator when the latter oscillates, such control signals being amplified in an electronic amplifier and the amplified signals being fed back to the resonator through the other coil electromechanically coupled with the resonator.

Since the systems incorporating two coils are relatively complicated, attempts have been made to use one single coil serving the double purpose of producing the control signals for control of an amplifier and of transmitting the output energy of the amplifier to the resonator for sustaining the mechanical oscillation thereof. In such a system a direct electrical coupling between the amplifier input and output is obtained through a common input and output circuit including the coil, and a feedback gain for this coupling is preferably selected in which the amplifier itself forms an electronic relaxation oscillator or multivibrator of which the frequency may be adjusted to the frequency of the resonator. The self-starting properties of such a system are much better than those of an oscillator system having no direct electrical feedback means, because of the self-starting electric oscillation of the relaxation oscillator or multivibrator will start the mechanical oscillation of the resonator. Once the mechanical oscillation of the resonator has been started up in this manner, the electronic oscillator is synchronized by the control signals induced by the mechanical oscillation, so that the time-keeping properties of the system are determined by the resonator.

However, the prior oscillator systems described above are disadvantageous because of the fact that accurate control of an amplifier, and particularly synchronization of a relaxation oscillator, substantially depends upon a constant amplitude of the control or synchronizing signal. It is well known that in order not to disturb the oscillation of the time-keeping resonator and to obtain maximum stability, the energy for sustaining the oscillation of the resonator should be applied exactly in phase with the resonator oscillation. More specifically, the oscillation of a balance wheel should be sustained by short energy impulses applied to the balance wheel at the instant of its passage through the position of equilibrium. However, it has been impossible with the prior systems to accurately control the synchronization of a relaxation oscillator under conditions of variations in the amplitude of the resonator.

It is the primary object of this invention to provide an oscillatory system for an electronic timepiece incorporating a relaxation oscillator in which means are incorporated so that the synchronization of the relaxation oscillator becomes independent of the amplitude of the synchronizing signal.

In order to obtain good self-starting properties of the system with low energy consumption during normal operation and automatic amplitude control for the resonator, the energy applied to the resonator should be high at no or low amplitude thereof and the energy consumption should decrease rapidly with increasing amplitude of the resonator. It is another object of this invention to provide means which improves the automatic amplitude control of the resonator of an electronic timepiece and reduces energy consumption thereof during normal operation of the resonator.

In accordance with the invention the foregoing objects are accomplished by providing an oscillatory system for an electronic timepiece incorporating a mechanical resonator carrying a coil coupled to a relaxation oscillator through a non-linear circuit element.

The construction is advantageous in that the driving pulse is produced at the equilibrium point of the resonator and so provides for the most dependable starting and bringing of the resonator to synchronous speed and the greatest running accuracy.

Figure 2:
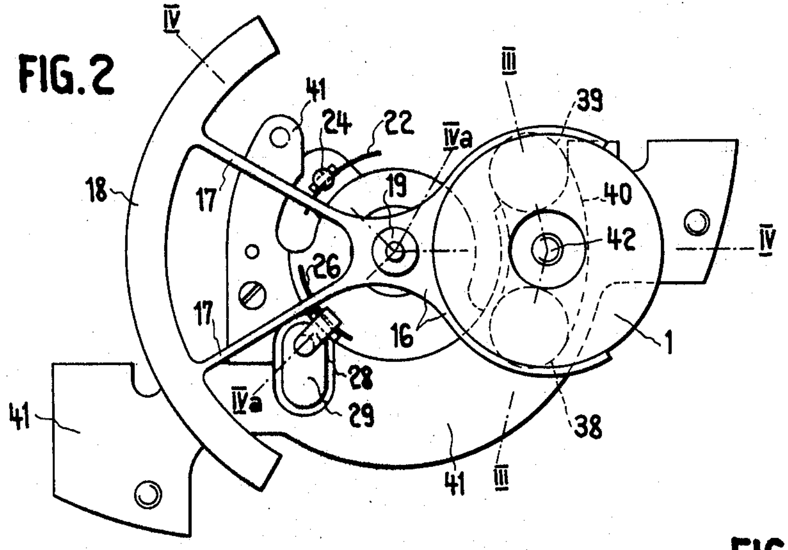
Figure 3:
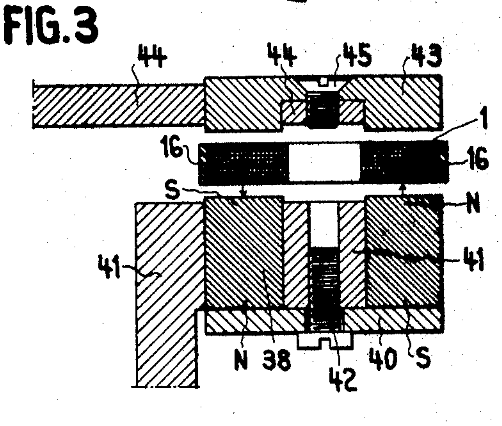
Figure 4A:
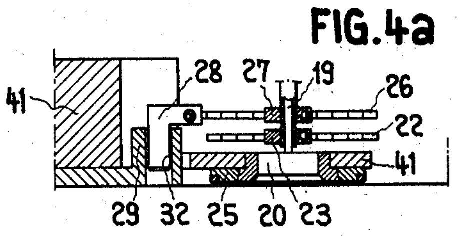
Figure 4:
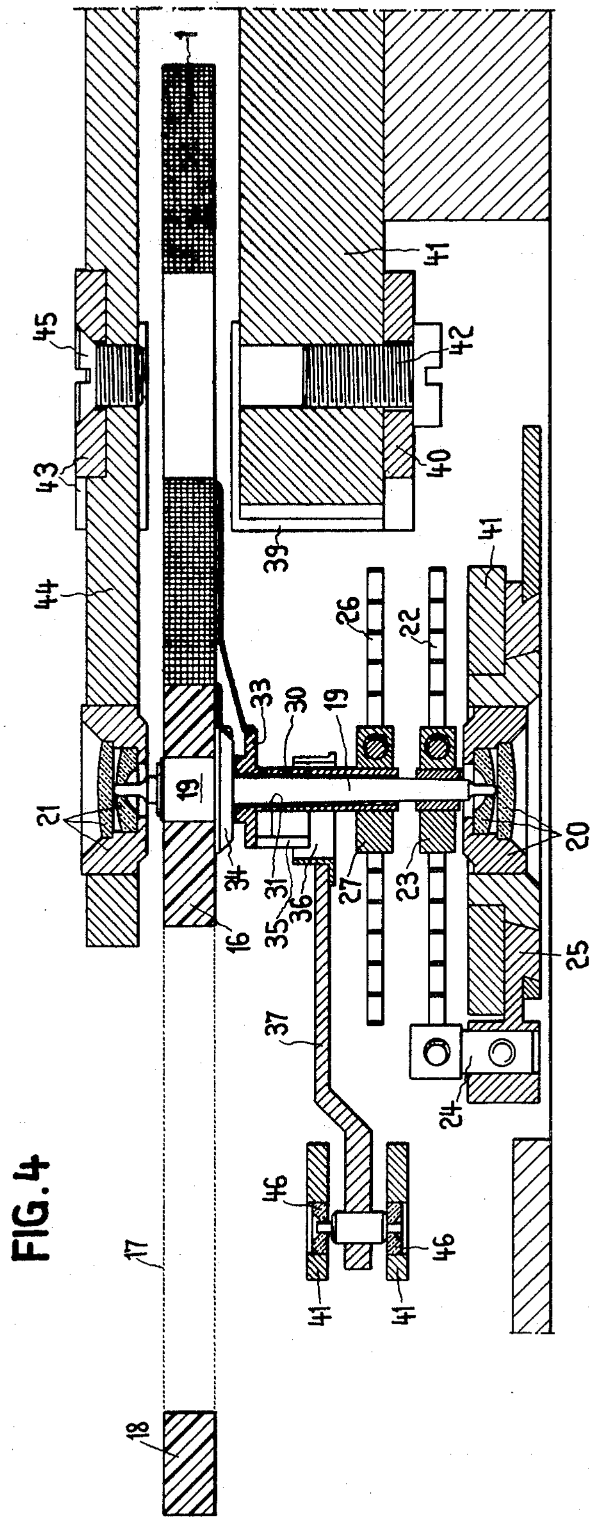
Figure 5A:
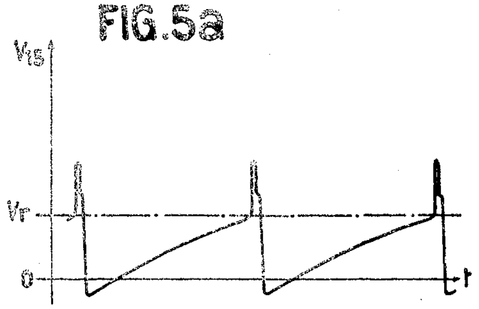
Figure 5B:
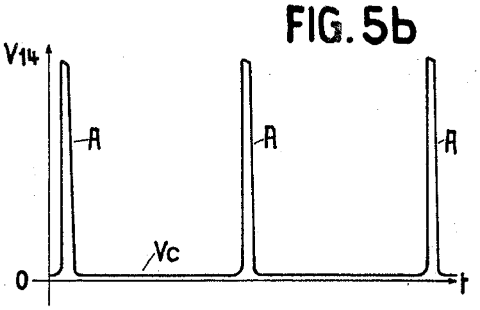
Figure 6:
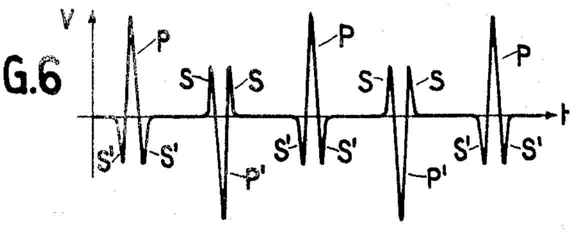
Figure 7A:
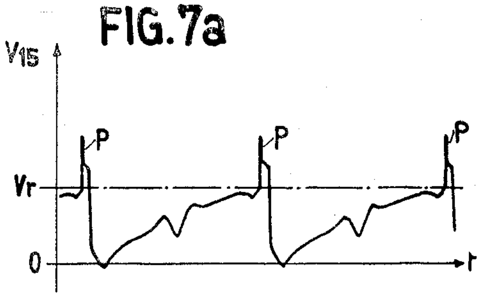
Figure 7B:
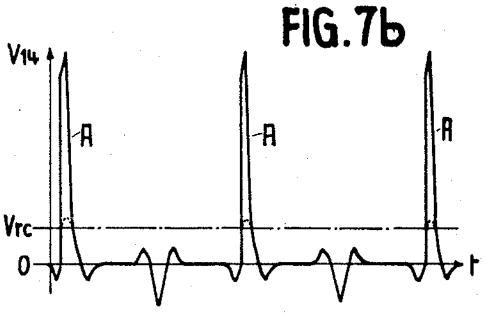
Figure 8A:
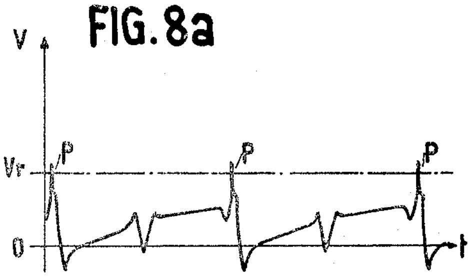
Figure 8B:
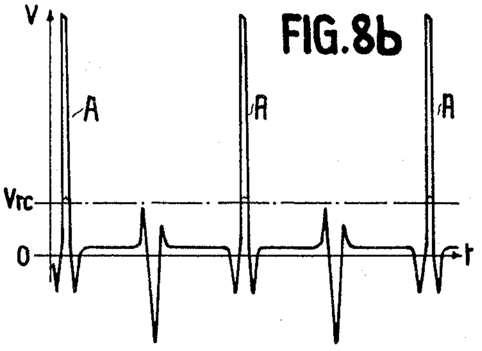
Figure 9:
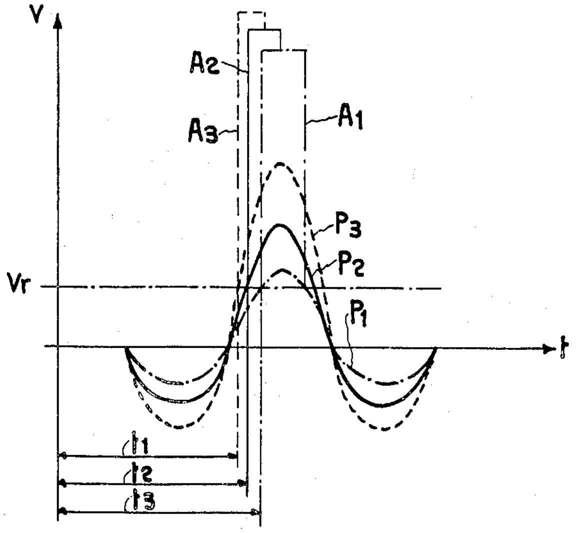
Figure 10:
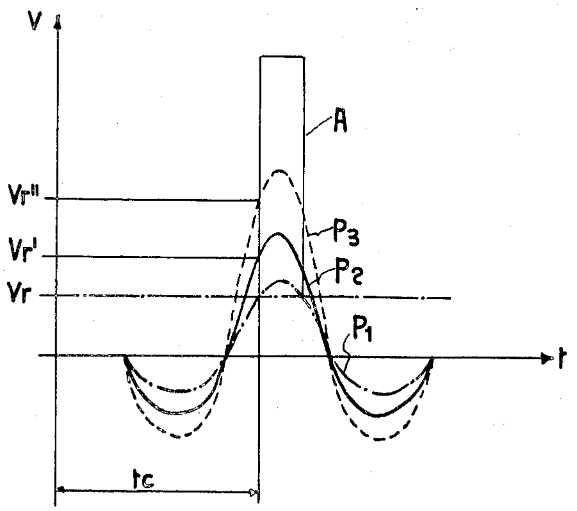

This invention will now be explained in detail with reference to the attached drawings wherein:

FIGURE 1 is a circuit diagram of the electrical system,

FIGURE 2 is a top view showing the balance wheel with the lower part of the magnetic system, FIGURE 3 is a sectional view at an enlarged scale of the coil and of the magnetic system taken along line III—III of FIGURE 2, whereby the thickness of all parts is shown twice the real values, FIGURE 4 is a sectional view taken along line IV—IV of FIGURE 2 and showing the balance wheel and the magnetic system, FIGURE 4*a* is a sectional view taken along line IV*a*—IV*a*— of FIGURE 2, FIGURES 5*a* and 5*b* are diagrams illustrating the wave shapes at terminals 15 and 14 respectively before oscillation of the balance-wheel system has started, FIGURE 6 is a diagram showing the wave shapes of the control pulses induced in the coil, FIGURES 7*a* and 7*b* are diagrams similar to FIGURES 5*a* and 5*b* showing the waveforms at terminals 15 and 14 respectively for operation at small amplitude of the balance-wheel system, FIGURES 8*a* and 8*b* are diagrams corresponding to FIGURES 7*a* and 7*b* for full amplitude of the balance-wheel system, FIGURE 9 is a diagram illustrating phase shifting in prior systems, and FIGURE 10 is a diagram corresponding to FIGURE 9 and illustrating the improved operation of the present system.

The oscillator system schematically shown in FIGURE 1 includes a coil 1 carried by a balance-wheel system in a manner explained below. By means of a diode 2 the coil 1 is connected to the collector of an output transistor 3. The collector of the transistor 3 is coupled with the base of an input transistor 5 by means of a feedback condenser 4. The base potential of transistor 5 is determined by resistors 6 and 7 forming a voltage divider together with a condenser 8 connected in parallel with the resistor 7. A load resistor 9 is connected to the collector of transistor 5 and a feedback resistor 10 is connected between the collector of transistor 5 and the base of transistor 3. A variable resistor 11 bridges the transistor 3. A resistor 12 is connected into the emitter circuit of transistor 5. The elements shown in FIG. 1 are connected to a battery 13 as illustrated.

The electronic circuit shown in FIG. 1 forms a multivibrator or relaxation oscillator wherein self-sustained oscillations are set up in a manner known per se. Operation of the electronic oscillator will be explained in detail below. The connecting point between diode 2 and the collector of transistor 3 is considered to be the output terminal 14 of the relaxation oscillator while the base connection 15 of transistor 5 is considered to be the input terminal of the relaxation oscillator, the feedback condenser 4 being connected between the output terminal 14 and the input terminal 15.

The mechanical and electromechanical disposition of the important parts of the timepiece is shown in FIGURES 2–4*a*. Coil 1 is mounted in a fork-shaped support of plastic material. The support has two arms 17 carrying a balancing weight 18, the whole system being accurately equilibrated. The support is mounted on a shaft 19 as shown in FIGURE 4, this shaft being pivoted in jewel bearings 20 and 21 in a manner well known in the art.

A lower hair spring 22 is mounted between a collet 23 fixed at the lower end of shaft 19 and a stud 24 in a manner well known in the art. The stud 24 is fixed in a sliding ring 25 rotatably mounted round the lower bearing 20. Therefore, the ring 25 with the stud 24 mounted thereon may be displaced in circumferential direction in order to adjust the position of equilibrium of the balance wheel system. An upper hair spring 26 is fixed between a collet 27 and stud 28 mounted in a plate portion 29 of the timepiece. The collet 27 is mounted on a sleeve 30 fixed on the shaft 19 by means of a layer of cement 31, whereby the sleeve 30 and collet 27 are electrically insulated from shaft 19. Similarly, the stud 28 is fixed in plate portion 29 by a layer of cement 32 and is thus electrically insulated from the plate. The sleeve 30 has an upper collar 33 and the shaft 19 has a collar 34 whereon is seated the support 16 for the coil 1. The coil ends are soldered to the collars 33 and 34 respectively. The coil 1 may thus be connected to the circuit shown in FIG. 1 through two electrically insulated circuits, the one comprising the electrically insulated stud 28, hair-spring 26, collet 27, sleeve 30 and collar 33, and the other circuit comprising the structure of the timepiece, the ring 25, stud 24, hair spring 22, collet 23, shaft 19 and collar 34.

Although the assembly of coil 1 and support 16–18 has little similarity with a classical balance wheel, it is obvious that this mechanically equilibrated system together with hair springs 22 and 26 forms a balance-wheel system able to oscillate at a frequency substantially determined by the moment of inertia of the rotating masses and the resulting spring constant of springs 22 and 26.

An excentric 35 is mounted on sleeve 30, this excentric engaging a fork 36 formed at the end of lever 37 pivoted in jewels 46. Upon oscillation of the balance-wheel assembly the lever 37 is oscillated at very small amplitude by the excentric 35 engaging fork 36, and a stepping wheel may be driven by a step pawl mounted on lever 37. The gear-train and the hands of the timepiece may be driven by the said stepping gear. The mechanical transmission of the movement from the balance-wheel system to the hands of the timepiece is not a part of this invention, and a suitable transmission system of the type indicated in FIG. 4 is shown in the copending patent application Serial No. 381,838, filed July 10, 1964. Any other system well known in the art may be used for this purpose. Of course, sleeve 30 should not be electrically connected to the structure of the timepiece by the motion-transmission system.

As shown in FIGS. 2–4*a* the coil 1 is mounted in the air gaps of a magnet system comprising a pair of cylindrical permanent magnets 38 and 39 cemented to a shunt 40 of soft iron mounted on a bridge 41 of the timepiece by means of a screw 42. Another shunt 43 of soft iron is mounted in an upper bridge 44 of the timepiece by means of a screw 45. As shown in FIG. 3 the permanent magnets 38 and 39 are magnetized in opposite direction so that a closed magnetic path and circuit is formed whereby two field portions of opposite polarity are formed between the permanent magnets 38 and 39 and shunt 43 as indicated by arrows in FIG. 3. The circumferential width of each of such field portions is substantially equal to the circumferential width of the coil portions or coil sides symmetrically located in such field portions as shown in FIG. 3, when the balance-wheel system is in its equilibrium position.

Operation of the timepiece will now be explained with reference to FIGS. 5–10 showing various diagrams of voltages appearing in the system. Assuming that the battery is connected to the circuit for the first time and the balance wheel is in its equilibrium position wherein the coil 1 is in a symmetrical position relatively to the magnet system as shown in FIG. 3, no voltage whatever is induced in coil 1, but a self-sustained oscillation will be sent up in the relaxation oscillator. Transistor 5 is first blocked because its base is maintained at negative potential and any current flow would increase the emitter potential and thereby further block the transistor due to the voltage drop at resistor 12. Transistor 3 is equally blocked because its base is maintained at positive potential through resistors 9 and 10. Condensers 4 and 8 become charged up through resistor 6 and when the potential at terminal 15 and at the base of transistor 5 reaches a predetermined positive potential transistor 5 turns conducting whereby the potential at its collector decreases due to the voltage drop in resistor 9. Through feedback resistor 10 the potential at the base of transistor 3 decreases accordingly and this transistor also turns conducting. The current flow through transistor 3, diode 2 and coil 1 produces a voltage drop in diode 2 and coil 1 so that the potential at terminal 14 increases. This increase in potential is transmitted to the base of transistor 5 through condenser 4 so that the current flow in transistor 5 further increases and consequently the current in transistor 3 is also increased due to the feedback through resistor 10. The unstable period may be called the pulse period of the oscillator. The current flow in both transistors suddenly increases when a predetermined release potential is reached at the base of input transistor 5, until saturation of the transistors is attained. Saturation of the transistors is brought about by the regenerative feedback loop in which both are contained. Saturation is essentially a static condition which cannot be maintained with a capacitive coupling 4, in the loop. Therefore, after a short interval determined by the time constants of the system, the action reverses, the regeneration is again effective and both transistors are abruptly cut-off. This operation of a multivibrator relaxation oscillator is of the self blocking type and well known in the art.

The operation of the relaxation oscillator with no oscillation of the balance wheel is illustrated in FIGURES *5a* and *5b*, in which FIGURE *5a* shows the potential at terminal 5 at the base of transistor 5 with relation to the negative battery terminal, and FIGURE *5b* shows the potential at terminal 14 at the collector of transistor 3 also with relation to the negative battery terminal. From FIGURE *5a* it is seen that the oscillator triggers at a predetermined releasing potential or threshold $V_r$ at the base of transistor 5 when the voltage at input 15 exceeds $V_r$. This results in the production of pulses A at output 14. Due to the resistor 11 bridging the output transistor 3 a residual current constantly flows in diode 2 and coil 1 thus a residual potential $V_c$ (FIGURE *5b*) always exists at terminal 14. However, this residual potential is very small and therefore the wattage consumption of the circuit is low. Both transistors are usually blocked and are conducting only during the extremely short pulse period of the oscillator.

The relaxation frequency of the oscillator is adjusted to a value slightly below the natural frequency of the balance-wheel system. Therefore, the current pulses shown in FIGURE *5b* and passing through coil 1 produce an electrodynamic force by which the balance wheel is moved from its equilibrium position and started to oscillate. Since the frequency of the oscillator only slightly differs from the natural frequency of the balance wheel, oscillation of the latter is started up within a short starting period.

As soon as the balance wheel has swung a relatively small amplitude of about 45 degrees the coil completely leaves the magnetic fields. When returning through the magnetic fields voltage pulses of the form shown in FIGURE 6 are induced. The manner in which the induced pulses are produced is as follows: When the first coil side passes between a magnetic field the first of the secondary pulses S is induced. When the same coil side passes through the next magnetic field a similar voltage of opposite polarity is induced in the same coil side, meanwhile since the other coil side simultaneously passes through the first magnetic field, a pulse of similar polarity and magnitude is added to the pulse induced in the first coil side, producing the principal pulse P. The other coil side then passes through the other magnetic field and produces another secondary pulse S. Since the coil alternatively swings through the magnetic fields in opposite directions, pulses of opposite polarity alternatively will be produced as shown in FIGURE 6, the positive pulses being indicated by P and S, the negative pulses indicated as P′ and S′.

The signals induced in coil 1 affect the voltage appearing at output terminal 14 due to the above described operation of the relaxation oscillator, and such voltage effect is transmitted through capacitor 4 to input terminal 15 and to the base of transistor 5. The voltages appearing at terminals 15 and 14 respectively for a balance wheel amplitude of 90 degrees are shown in FIGURES *7a* and *7b* which correspond to FIGURES *5a* and *5b*. It may be seen from these diagrams that the relaxation oscillator is released by the action of the positive principal pulse P of each second signal induced in the coil 1. At small amplitudes below about 45° the voltage pulses induced in coil 1 are unable to synchronize or release the relaxation oscillator. However, although no synchronization occurs during the starting period mentioned above, this period is so short that no appreciable phase shifting due to the difference of the natural frequency of the balance wheel and of the relaxation oscillator occurs during the above starting period.

The effect of the voltage pulses appearing in the coil 1 upon its oscillation will now be explained. Immediately after a pulse, input terminal 15 at the base of transistor 5 is negative with respect to its emitter by approximately the battery voltage less the voltage drop across resistor 12 due to the emitter current of transistor 5. Actually the collector-emitter drop of transistor 3 and the base-emitter drop of transistor 5 subtract from this voltage, but these drops are small and may be considered negligible for this explanation. Thus the base of transistor 5 is negative with respect to its emitter by this voltage stored in capacitors 4 and 8. Immediately capacitor 4, and capacitor 8, start to discharge through the diode 2, the coil 1, the battery 13, and resistor 6 in a series circuit. Ignoring the battery and the effect of resistor 7, the time constant of the series circuit, and the potential at input terminal 15, after any given time interval will be affected by a change in the resistance of any of the series components, coil 1, diode 2, or resistor 6. The resistance of the diode 2 during forward conduction is non-linear depending upon the current passing therethrough.

The variation of the current through the diode 2, and thus a change in its resistance is brought about as follows: For a low amplitude oscillation of the coil 1 a small intermediate negative pulse is produced which draws little current through the diode 2 from the output terminal 14 and hence has little effect on the voltage at this point as a result of any charge being drawn from capacitors 4 and 8. The capacitors 4 and 8 are considered in series for this action. After the small negative pulse is over the current flow through the diode 2 and the coil 1 reverts substantially to a "normal" value of current determined by the battery 13 voltage, resistor 11, and the corresponding resistance of diode 2.

Under these conditions the voltage at the input terminal 14 will rise at a rate such that after a predetermined length of time a small positive generated pulse from the coil 1 will be sufficient to back-bias the diode 2, permitting a voltage rise at the output terminal 14 by reason of the decrease in current through the diode 2, and thus overcoming the small remaining cut-off bias at the input terminal 15 at the base of transistor 5 so as to achieve synchronization of the relaxation oscillator or multivibrator with the balance wheel. Note that the generated positive pulse from the coil 1 merely blocks, or partially blocks, the current flow from the battery 13 through the resistor 11 which would normally flow through the diode 2 and hence achieves the effect of a positive pulse through the capacitor 4 to the base of the transistor 5. There is no actual reverse current through the diode 2. With very little current flowing in the forward direction, the resistance of the diode 2 is very high, of the order of $10^5$ ohms, whereas the diode resistance is relatively low in the order of $10^3$ ohms during the power driving pulses. The cut-off of current through the diode 2 allows the output terminal 15 to swing toward the battery potential by current flow through the resistor 11 into the capacitor 4 and so constitutes a positive pulse by coupling through the capacitor 4 to the base of the transistor 5.

With a large amplitude of oscillation of the coil 1 a large intermediate negative pulse is generated due to the proportionately higher speed of the coils through the magnetic fields. This larger pulse withdraws a relatively large charge through the diode 2 from the output terminal 14 and the combined capacity of the capacitors 4 and 8 considered in series. After the pulse has passed, a more negative condition exists at the output terminal 14 than would have been the case after the generation of a small intermediate negative pulse by the coil 1. With a relatively more negative condition at the output terminal 14, the current flow through the diode 2 and the coil 1 decreases. The lower current through the diode 2, due to its nonlinear characteristic, results in a rise in its effective resistance.

This increase in resistance results in a lengthening of the time constant of the circuit composed of the diode 2, the coil 1, the battery 13, the resistor 6 and the capacitor 4. The result is that at the end of the predetermined time interval the input terminal 15 is still at a relatively more negative potential than would have been the case with a small or no intermediate pulse. Therefore, a correspondingly higher amplitude positive pulse is necessary from the coil 1 to cause the transistor 5 to go into conduction and thereby achieve synchronization. The early part of the rise of the generated pulse from the coil 1 merely serves to overcome the additional negative bias on the base of the transistor 5 so that the actual triggering of the transistor 5 occurs at the same time irrespective of the amplitude of oscillation of the coil 1.

FIGURES 7*a* and 7*b* show the pulse waveforms respectively at the input 15 to the base of transistor 5 and the output 14 at the collector of the transistor 3 for a small amplitude of oscillation of the coil 1 of the order of 90 degrees. A broad driving pulse A corresponding to a current of 20 microamperes is being drawn as the resonator or balance wheel is being accelerated towards its normal amplitude of oscillation.

FIGURES 8*a* and 8*b* correspond to FIGURES 7*a* and 7*b*. It will be noted that the driving pulses A are centered and narrow corresponding to a current of 6.5 microamperes as the resonator or balance wheel is now at its natural oscillating frequency and at a large amplitude of oscillation of the order of 220 degrees. Inasmuch as the triggering input pulses and the driving output pulses are practically merged together the driving current is applied to the coil when the coil passes through its equilibrium position.

In FIGURE 9 there is shown a diagram illustrating the phase shifting which occurs for triggering or control pulses of various amplitudes in prior art systems. It will be noted that for pulses of amplitudes $P_1$, $P_2$ and $P_3$, the the triggering times of the system will be as indicated respectively at $t_1$, $t_2$ and $t_3$. The corresponding power pulses will be $A_1$, $A_2$ and $A_3$ resulting in a system of poor efficiency.

In FIGURE 10 there is shown a diagram corresponding to FIGURE 9 but illustrating the centering of the driving pulse with the triggering pulse irrespective of variations in amplitude of the triggering or control pulses resulting in efficient operation.

In a practical construction in accordance with the invention excellent results have been obtained with the following values of the elements of the system:

| | |
|---|---|
| Coil 1: | |
| Thickness | .5 mm. |
| Outer diameter | 6 mm. |
| Inner diameter | 2 mm. |
| Number of turns | 2750. |
| Ohms | 2900. |
| Diode 2, type "Transistron GMD 1" | 20 mv. at .2 $\mu$a., 200 mv. at 200 $\mu$a. |
| Transistor 3 PNP, Philips BCZ13, Si, current amplification at 200 $\mu$a. | 100. |
| Transistor 5 NPN, Fairchild or I.T. & T. BSY 66/67, current amplification at 2 $\mu$a. | 40. |
| Condenser 4 | 60,000 pf. |
| Condenser 8 | 60,000 pf. |
| Resistor 6 | 3.3 megohms. |
| Resistor 7 | 10 megohms. |
| Resistor 9 | 1 megohm. |
| Resistor 10 | 100,000 ohms. |
| Resistor 11 | 1 megohm. |
| Battery voltage | 1.35 v. |
| Width of air gaps | 1 mm. |
| Induction of magnetic field portions | 1,200 gauss. |

The oscillator system described above has excellent starting conditions and extremely low current consumption at full amplitude. The average current consumption at zero amplitude of the balance-wheel system is 18 $\mu$a. so that the oscillation rapidly starts due to driving output pulses of high energy but the average current consumption drops to 6.5 $\mu$a. at full amplitude. Therefore, a most efficient automatic amplitude control and amplitude limitation is obtained because the driving energy rapidly increases when the amplitude of the balance-wheel system decreases.

What I claim is:

1. An oscillator system for an electronic timepiece, comprising a pair of transistors, a feedback circuit interconnecting said transistors, said pair of transistors and feedback circuit forming an electronic oscillator circuit adapted to oscillate at a first frequency, a resonator adapted to oscillate at a second frequency exceeding the said first frequency, a coil electromagnetically coupled with the said resonator for transmitting driving energy to said resonator and for receiving control signals from the said oscillating resonator, and a nonlinear circuit element series-connected between said coil and said oscillator circuit, whereby the said oscillator circuit is synchronized by said control signals.

2. An oscillator system for an electronic timepiece, comprising an electronic oscillator adapted to oscillate at a first frequency, an output transistor in said oscillator circuit having an output electrode, an input transistor in said oscillator circuit having a control electrode, a feedback circuit between said output electrode and said control electrode, a resonator adapted to oscillate at a second frequency slightly exceeding the said first frequency, a coil electromagnetically coupled with said resonator for transmitting driving energy to said resonator and for receiving control signals from the oscillating resonator, a diode series-connected between said output electrode and said coil, a direct current circuit being thereby formed including a series connection of said output transistor, said diode, and said coil, with the said diode in its forward direction transmitting driving energy current flow, the said coil being connected into said direct current circuit with the polarity of said control signals opposite to the current flow in said direct current circuit, the diode operating in its low-resistance forward range when transmitting driving energy current flow through said output transistor to said coil and in its high-resistance non-linear forward range when control signals are generated in said coil.

3. An oscillator system according to claim 2, wherein the said feedback circuit comprises a condenser connected between said output electrode and said control electrode.

4. An oscillator system according to claim 2, comprising a resistor parallel-connected to said output transistor into said direct current circuit.

5. An oscillator system according to claim 4, wherein said resistor is a variable resistor.

6. An oscillator system according to claim 2, comprising a voltage divider bridging said input transistor and having its mid tap connected to said control electrode formed by the base of said input transistor, and a charging condenser bridging the base and emitter circuit of the input transistor.

7. An oscillator system comprising amplifier means having an output and an input, feedback means between said output and input adapted to set up self-sustained oscillation in said amplifier means, a resonator, a single coil having two terminals and electromagnetically coupled with said resonator for transmitting driving energy to said resonator in order to sustain oscillation thereof and for receiving control signals from the oscillating resonator, and a non-linear circuit element series-connected between the one terminal of said coil and said output of the amplifier means.

8. An oscillator system for an electronic timepiece, comprising an output pnp-transistor and an input npn-transistor, first feedback means between the collector of said output transistor and the base of said input transistor and second feedback means between the collector of said input transistor and the base of said output transistor, said transistors and feedback means constituting a relaxation oscillator wherein both transistors are conducting during pulse intervals and both transistors are shut off between said pulse intervals, a resonator adapted to oscillate at a frequency slightly exceeding the natural frequency of said relaxation oscillator, a coil electromagnetically coupled with said resonator, a non-linear circuit element series-connected with said coil, said non-linear element and coil being connected to the collector to said output transistor.

9. An oscillator system for an electronic timepiece, comprising a balance wheel, a coil mounted on said balance wheel, permanent magnet means fixed in said timepiece and electromagnetically coupled with said coil, said coil being in a position symmetrical to said permanent magnet means when the balance wheel is in its neutral rest position, control pulses being thereby induced in said coil upon passage of the oscillating balance wheel through its rest position, the shape of such pulses being symmetrical with reference to the instant of passage of the balance wheel through its neutral position, a pulse oscillator having an output and an input and feedback means between said output and input, said pulse oscillator adapted to oscillate at a natural frequency slightly below the natural frequency of the balance wheel, a non-linear circuit element having a high resistance when low voltage and current is applied to it and a low resistance when high voltage and current is applied to it, said non-linear element being series-connected between said output and said coil, said control pulses being effective at said input from said non-linear element and said feedback means whereby the pulse generator is synchronized by said control pulses to produce pulses symmetrical to said control pulses independently of the magnitude of amplitude of oscillation of the balance wheel.

10. An oscillator system for an electronic timepiece, comprising a resonator, a coil electromagnetically coupled with said resonator, a pulse oscillator comprising an output transistor having an output electrode and an input transistor having an input electrode, a feedback circuit including a condenser between the output electrode of said output transistor and the input electrode of said input transistor, and a diode connected between said output electrode and said coil in its forward direction for transmitting driving pulses from said output electrode of the output transistor through the diode to said coil, whereby the effect of control signals induced in said coil upon oscillation of said resonator is transmitted through said diode and feedback circuit to said input electrode, so that control of said pulse oscillator is automatically achieved irrespective of the magnitude of the amplitude of said control signals.

11. An oscillator system for an electronic timepiece, comprising an electronic relaxation oscillator having an output and an input, a feedback condenser connected between said output and input, a resonator having a frequency slightly exceeding the frequency of said relaxation oscillator, a coil and a permanent magnet system electromagnetically coupled with each other and operatively associated with the resonator for producing control signals upon oscillation of said resonator, a control and energizing circuit connected to said output of the relaxation oscillator and including a non-linear circuit element series-connected with said coil for drawing current from said oscillator, said relaxation oscillator being adapted to be synchronized by control signals produced in said coil and effected through said non-linear circuit element and said feedback condenser to said input, whereby the current drawn from said oscillator depends upon the magnitude of ampliutde of oscillation of said resonator due to said non-linear circuit element so that the synchronizing threshold of the relaxation oscillator increases with increasing amplitude of the control signals.

12. An oscillator system for an electronic timepiece, comprising a balance wheel, a coil fixed on said balance wheel, and having two coil portions spaced in circumferential direction, a fixed system of permanent magnet means producing two parallel magnetic fields of opposite polarity passing each through one of said spaced coil portions when the balance wheel is in its neutral rest position, control signals being induced in said coil upon oscillation of said balance wheel, said control signals each including a principal pulse and a pair of symmetrical secondary pulses of smaller amplitude and of a polarity opposite to that of the principal pulse, the time axis of said control signals coinciding with the passage of the balance wheel through its neutral position, and a relaxation oscillator operative by a self-sustained oscillation at a frequency below the natural frequency of said balance wheel, said coil being coupled to said relaxation oscillator by means of a diode.

References Cited by the Examiner

UNITED STATES PATENTS 3,118,098 1/1964 Reich .............. 318—128

ORIS L. RADER, *Primary Examiner.*

C. W. DAWSON, *Examiner.*